(12) United States Patent
Nijenhuis et al.

(10) Patent No.: US 9,120,895 B2
(45) Date of Patent: *Sep. 1, 2015

(54) FLEXIBLE POLYMER

(75) Inventors: Atze Jan Nijenhuis, Sittard (NL); Zeynep Ozyurek, Maastricht (NL)

(73) Assignee: DSM IP ASSETS B.V., Heerlen (NL)

( * ) Notice: Subject to any disclaimer, the term of this patent is extended or adjusted under 35 U.S.C. 154(b) by 602 days.

This patent is subject to a terminal disclaimer.

(21) Appl. No.: 13/264,821

(22) PCT Filed: Apr. 20, 2010

(86) PCT No.: PCT/EP2010/055155
§ 371 (c)(1),
(2), (4) Date: Feb. 1, 2012

(87) PCT Pub. No.: WO2010/122002
PCT Pub. Date: Oct. 28, 2010

(65) Prior Publication Data
US 2012/0123086 A1    May 17, 2012

(30) Foreign Application Priority Data
Apr. 20, 2009 (EP) .................................. 09158263

(51) Int. Cl.
*C08G 69/48* (2006.01)
*C08G 69/34* (2006.01)
*C08G 18/60* (2006.01)
*C08G 69/44* (2006.01)

(52) U.S. Cl.
CPC ............... *C08G 69/34* (2013.01); *C08G 18/60* (2013.01); *C08G 18/603* (2013.01); *C08G 69/44* (2013.01)

(58) Field of Classification Search
CPC ............................. C08G 18/60; C08G 18/603
USPC ................. 525/420, 420.5; 524/114; 528/332
See application file for complete search history.

(56) References Cited

U.S. PATENT DOCUMENTS

| | | | |
|---|---|---|---|
| 2,617,813 A | | 11/1952 | Ralston et al. |
| 5,455,309 A | * | 10/1995 | Albini et al. ............... 525/420.5 |
| 2010/0120957 A1 | * | 5/2010 | Bahr et al. .................... 524/377 |

FOREIGN PATENT DOCUMENTS

| | | |
|---|---|---|
| FR | 1 581 969 | 9/1969 |
| WO | WO 02/092662 | 11/2002 |

OTHER PUBLICATIONS

International Search Report for PCT/EP2010/055155 mailed Jun. 23, 2010.

* cited by examiner

*Primary Examiner* — Gregory Listvoyb
(74) *Attorney, Agent, or Firm* — Nixon & Vanderhye P.C.

(57) ABSTRACT

Thermoplastic elastomer containing hard segments and soft segments, the soft segments containing the residue of a dimerized fatty acid and the residue of a dimerized fatty amine.

6 Claims, No Drawings

FLEXIBLE POLYMER

This application is the U.S. national phase of International Application No. PCT/EP2010/055155 filed 20 Apr. 2010 which designated the U.S. and claims priority to EP 09158263.5 filed 20 Apr. 2009, the entire contents of each of which are hereby incorporated by reference.

The invention relates to a polymer having improved flexibility that may be produced from renewable sources.

The use of monomeric residues in polymers, which monomeric residues may be obtained from renewable sources is increasingly important. The use of the monomeric residues obtainable from renewable resources that need not be produced from fossil carbon is a desirable way of reducing the greenhouse gasses by the production of polymers.

A good example is the use of dimerised fatty acid residues in polymers. Dimerised fatty acid residues are used to impart flexibility to a polymer.

From US 2006/0235190 a semi crystalline, melt processable, partially aromatic copolyamide is known containing a residue of a dimerised fatty acid. The dimerised fatty acid contains two carboxylic groups that may be used for copolymerizing the fatty acid. In order to copolymerize the dimerised fatty acid into the polyamide aliphatic diamines, for example hexamethylene diamine, are used. The same principle is known for thermoplastic copolyesters containing residues of dimerised fatty acids. Although the copolymers show increased flexibility there is need for copolymers having a still further increased flexibility.

Object of the invention is therefore to provide such a copolymer having increased flexibility, especially at lower temperatures.

Surprisingly this object is obtained by a thermoplastic elastomer containing hard segments and soft segments, the soft segments containing the residue of a dimerised fatty acid and the residue of a dimerised fatty amine.

The thermoplastic elastomer according to the invention is very flexible. Therefore the thermoplastic elastomer may be used in many applications.

The thermoplastic elastomer according to the invention shows rubbery behavior already at relatively low temperature, because of its low glass transition temperature. The weakening point of the polymer is at a relatively high temperature. Furthermore the elastic modulus of the thermoplastic elastomer according to the invention has a rather constant value between the glass transition temperature and the softening point. This results in a large temperature area in which the thermoplastic elastomer according to the invention can be used.

Moreover the content of residues based on renewable resources in the polymer is increased.

The dimerised fatty acids may be obtained from monomeric unsaturated fatty acids by an oligomerisation reaction. The oligomer mixture is further processed, for example by distillation, to yield a mixture having a high content of the dimerised fatty acid. By subsequently catalytic hydrogenation double bonds in the dimerised fatty acid may be saturated. The term dimerised fatty acid as it is used here relates to both types of these dimerised fatty acids, the saturated and the unsaturated.

The dimerised fatty acids may contain up to 44 carbon atoms. Preferably the dimerised fatty acid contains 36 carbon atoms.

Further details relating to the structure and the properties of the dimerised fatty acids may be found in the corresponding leaflet "Pripol C36-Dimer acid" of the company UNICHEMA (Emmerich, Germany) or in the brochure of the Company COGNIS (Düsseldorf, Germany) "Empol Dimer and Poly-basic Acids; Technical Bulletin 114C (1997)".

A suitable way to obtain the dimerised fatty amine is to replace the acid groups of the dimerised fatty acids by amine groups. This replacement can be done in a first step by converting the acid groups of the dimerised fatty acid into amide groups, by reaction with ammonia. In a second step the amide groups are converted into a nitril group at high temperatures, for example between 280 and 320° C. The nitril group may be converted in the final step into the amine by hydrogenation of the nitril group.

In a further step pre-polymerized soft segments are preferably formed by a condensation reaction of a mixture of the dimerised fatty acid and the dimerised fatty amine. In this way easily long soft segments with a low glass transition temperature may be obtained.

Depending on the ratio of dimerised fatty acids and dimerised fatty amines as well as the degree of polymerization of the fatty acid and the fatty amine the end groups of the pre-polymerized soft segments are tuned to be acid groups or amine groups. Depending on the reaction, further monomers and/or pre-polymers that that are used to produce the final thermoplastic polymer, it might be desirable to have acid end groups or amine end groups, or eventually both end groups may be present. Good results are obtained if the end groups have been converted into hydroxyl groups. This is because a very stable thermoplastic elastomer may be obtained in this way, especially if the thermoplastic elastomer contains hard polyester segments. It is for example possible to modify the acid end groups into hydroxyl end groups by reacting with amino alcohol. Amine end groups may be converted likewise by reacting with a cyclic ester lactone or a hydroxyl acid.

The pre-polymerized soft segment preferably has a number average molecular weight (Mn) of at least 600 kg/kmol, more preferably at least 1000 kg/kmol, even more preferably at least 2000 kg/kmol. The Mn is preferably at most 5000 kg/kmol, more preferably at most 2500 kg/kmol.

It is possible to produce thermoplastic elastomers according to the invention that have a Shore D value of between 25 and 90. Preferably the shore D value is between 30-75, even more preferably between 40 and 60. The desired shore D value may be obtained by changing the fraction of the soft segments in the thermoplastic elastomer. With increasing the fraction the shore D values decrease. Preferably the thermoplastic elastomer is very soft and has a shore A of 60-80, preferably 65-80. Examples of thermoplastic elastomers according to the invention are thermoplastic elastomers having hard segments of polyester, nylon and polycarbonate, the soft segments containing the residue of the dimerised fatty acid and the residue of the dimerised fatty amine.

Preferably the thermoplastic elastomer is a polymer containing hard segments of polyester and the soft segments containing a residue of a dimerised fatty acid and a residue of a dimerised fatty amine.

Such a thermoplastic elastomer suitably contains hard segments that are built up from repeating units derived from at least one alkylene diol and at least one aromatic dicarboxylic acid or an ester thereof. The linear or cycloaliphatic alkylene diol contains generally 2-8 C-atoms, preferably 2-4 C-atoms. Examples thereof include ethylene glycol, propylene diol and butylene diol. Preferably propylene diol or butylene diol are used, more preferably 1,4-butylene diol. Examples of suitable aromatic dicarboxylic acids include terephthalic acid, 2,6-naphthalenedicarboxylic acid, 4,4'-biphenyldicarboxylic acid or combinations of these. The advantage thereof is that the resulting polyester is generally semi-crystalline with a melting point of above 150, preferably above 175, and more preferably of above 190° C. The hard segments may optionally further contain a minor amount of units derived from other dicarboxylic acids, for example isophthalic acid, which generally lowers the melting point of the polyester. The amount of other dicarboxylic acids is preferably limited to not more than 10, more preferably not more than 5 mol %, based on the total amount of dicarboxylic acids, so as to ensure that, among other things, the crystallization behaviour of the copolyether ester is not adversely affected. The hard segment is preferably built up from ethylene terephthalate, propylene terephthalate, and in particular from butylene terephthalate as repeating units. Advantages of these readily available units include favourable crystallisation behaviour and a high melting point, resulting in a thermoplastic elastomer according to the invention with good processing properties, excellent thermal and chemical resistance and good puncture resistance.

The content of renewables in the polymer might be further increased by using diols from renewable sources, for instance 1,3-propanediol and 1,4-butane diol produced from renewable sources.

The thermoplastic elastomers of the present invention may be compounded in all kind of polymer compositions replacing known elastomers and thermoplastic elastomers. The composition may further contain the usual additives, for example heat stabilizers, UV stabilizers, antistatic agents, flame retardants, lubricants and mould release agents. The polymer composition suitably contains stabilizers for the stabilization of nylons, for instance Bruggeman additives.

The invention also relates to shaped articles containing the polymer according to the invention.

Suitable processing techniques for producing shaped articles of the polymer according to the invention include extrusion, injection molding, compression molding, blow molding etc.

The invention is further explained by the examples, without being restricted thereto.
Materials Used:
BDO: butane diol, delivered by BASF in Germany.
DMT: Dimethylterphthalate, delivered by Oxxynova in Germany
$Mg(OAc)_2 4H_2O$, $LiAlH_4$, THF, NaOH and ammonia delivered by Sigma-Aldrich in Belgium
Pripol 1009: dimerised fatty acid, delivered by Uniqema in Germany.
Irganox 1330, anti-oxidant, delivered by Ciba Speciality Chemicals in Switserland.
Raney Co, raney cobalt catalyst, delivered by Merck, the Netherlands.
Preparation of the Dimerised Fatty Amine:

A 1 l round bottom flask equipped with thermometer, distillation setup and mechanical stirrer is charged with 100 g of the dimerised fatty acid and 500 ml ammonia.

Under stirring the reaction mixture is heated to 180° C. and kept at 180° during 1 hr, next vacuum is applied and the mixture is kept under vacuum until the acid value is below 1 mgKOH/g after which a dimerised fatty amide is obtained.

In the next step the mixture is heated under vacuum to 280° C. and maintained at that temperature for 2 hrs after which a dimerised fatty nitril is obtained.

The reaction mixture is dissolved in methanol and charged to a hydrogenation vessel which contained Raney Cobalt. The mixture is hydrogenated at 70° C. using 40 atm pressure during 1 hr. After cooling and evaporation of the methanol 90 g a dimerised fatty amine is obtained.

Alternatively the dimerised fatty amide is dissolved in dry THF and reduced using 2 eq LiAlH4 under reflux conditions. After refluxing for 16 hrs carefully a 1N NaOH solution is added, the mixture refluxed for 1 hr after which the salts are removed by filtration. The salts are washed with THF and the combined THF layers are dried over $Na_2SO_4$, the solvent evaporated after which the dimerised fatty amine is obtained. This procedure is more suited for smaller scale experiments. For further details is referred to the examples of WO 2008/053113.
Preparation of the Pre-polymerized Soft Segments:
Soft segment 1 (Mn≈2000)

To a 2000 ml 3-neck flask equipped with stirrer, nitrogen inlet, PT100, Dean-Stark receiver filled with xylene, heating mantle and temperature control unit, 796.8 g (1.4 mol) Pripol 1009 and 35 g xylene are added and heated to about 130° C. while stirring and padding with nitrogen. 432.4 g (0.81 mol) of the dimerised fatty amine is added and the resulting mixture is heated until no more water was distilled of. The Dean-Stark receiver is replaced by a distillation setup and the mixture is heated to 180° C. When 180° C. is reached, vacuum is applied to the reactor. The reaction mixture is maintained at 180° C. until acid value smaller than 56 mg KOH/g.
Soft Segment 2 (Mn≈800)

To a 1000 ml 3-neck flask equipped with stirrer, nitrogen inlet, PT100, distillation setup, heating mantle and temperature control unit, 431 g (0.76 mol) Pripol 1009 and 74 g (0.14 mol) dimerised fatty amine is added and mixed. The flask is heated to about 180° C. while stirring and padding with nitrogen. When 180° C. is reached, vacuum is applied to the reactor. The reaction mixture is maintained at 180° C. until acid value 56 mg KOH/g
Soft Segment 3 (Mn≈2000)

To a 2000 ml 3-neck flask equipped with stirrer, nitrogen inlet, PT100, distillation setup, heating mantle and temperature control unit, 796.8 g (1.4 mol) Pripol 1009 and 432.4 g (0.81 mol) dimerised fatty amine are added and slowly heated to 180° C. while stirring and padding with nitrogen. When 180° C. is reached, vacuum is applied to the reactor. The reaction mixture is maintained at 180° C. until acid value 56 mg KOH/g.
Soft Segment A (Mn≈2000)

To a 1000 ml 3-neck flask equipped with stirrer, nitrogen inlet, PT100, Dean-Stark receiver filled with xylene, heating mantle and temperature control unit, 1093 g (1.94 mol) Pripol 1009 and 15 g xylene are added and heated to about 130° C. while stirring and padding with nitrogen. 155.2 g (1.34 mol) Hexamethylene diamine (in about 100 g water) is added and the resulting mixture is heated until no more water is distilled of. The Dean-Stark receiver is replaced by a distillation setup and the mixture is heated to 180° C. When 180° C. is reached, vacuum is applied to the reactor. The reaction mixture is maintained at 180° C. until acid value 56 mg KOH/g.

EXAMPLE 1

Preparation of Thermoplastic Elastomer 1

A thermoplastic elastomer containing polyester based hard segments and 50%-wt soft segment 1 is prepared adding 1,4-BDO (31.65 g), DMT (43.87 g) soft segment 1 (50 g), Irganox 1330 (0.25 g), TBT (40.0713 mg/g BDO) stock solution (1.034 g), $Mg(OAc)_2 4H_2O$ (0.026 g) into reaction flask and degassed (20 mbar) 3 times followed by a nitrogen purge. At the first step the temperature is kept at 225° C. till all the formed methanol is removed from the medium in ~70 minutes under nitrogen at 1 atm. Last traces of methanol are removed by keeping the pressure (step wise) at 100 mBar for 20 min. At the second step the temperature is increased to 240° C. beginning of the polycondensation reaction and toward the end, finally the reaction is continued under high vacuum. At the second step, polycondensation occurs via transesterfication reaction and excess of BDO is distilled of during the second step. Usually the reaction is decided to stop while the torque reaches 65 N/cm for 25 rpm. When the polyesterification reaction is complete, thermoplastic elastomer 1 is removed while it is warm and it is quenched in water.

EXAMPLE 2

Thermoplastic Elastomer 2

Thermoplastic elastomer 2 containing 50 wt. % of soft segment 2 is prepared according to the procedure of example 1

EXAMPLE 3

Thermoplastic Elastomer 3

Thermoplastic elastomer 3 containing 50 wt. % of soft segment 3 is prepared according to the procedure of example 1

COMPARATIVE EXPERIMENT A

Thermoplastic Elastomer A

Thermoplastic elastomer A containing 50 wt. % of soft segment A is prepared according to the procedure of example 1

Thermoplastic elastomer 1 and A are compression molded into small flat sheets having a thickness of about 3 mm. the sheet of thermoplastic elastomer 1 according to the invention is more flexible than the sheet of thermoplastic elastomer A.

The invention claimed is:

1. A thermoplastic elastomer comprising hard segments of polyester and soft segments, wherein the soft segments consist of a pre-polymerized condensation reaction product residue mixture consisting of dimerised fatty acids and dimerised fatty amines.

2. The thermoplastic elastomer according to claim 1, wherein the pre-polymerized condensation reaction product residue mixture consists of dimerised fatty acids and dimerised fatty amines up to 44 C-atoms.

3. The thermoplastic elastomer according to claim 1, wherein the soft segments have a number average molecular weight of at least 600 kg/kmol.

4. The thermoplastic elastomer according to claim 1, wherein the thermoplastic elastomer has a shore D hardness of between 25 and 90.

5. The thermoplastic elastomer according to claim 1, wherein the hard segments of polyester are built up from butylene terephthalate repeating units.

6. A shaped article which comprises the thermoplastic elastomer of claim 1.

* * * * *